United States Patent
Bitzl et al.

(10) Patent No.: US 8,790,016 B2
(45) Date of Patent: Jul. 29, 2014

(54) BEARING ARRANGEMENT

(75) Inventors: Jürgen Bitzl, Bergrheinfeld (DE);
Burkhard Buchheim, Schweinfurt (DE); Alexander Dilje, Schweinfurt (DE); Helmut Hauck, Euerbach (DE); Stefanie Seufert, Rothausen (DE)

(73) Assignee: Aktiebolaget SKF, Gothenburg (SE)

( * ) Notice: Subject to any disclaimer, the term of this patent is extended or adjusted under 35 U.S.C. 154(b) by 6 days.

(21) Appl. No.: 13/512,378

(22) PCT Filed: Oct. 25, 2010

(86) PCT No.: PCT/EP2010/068167
§ 371 (c)(1),
(2), (4) Date: Aug. 10, 2012

(87) PCT Pub. No.: WO2011/067151
PCT Pub. Date: Jun. 9, 2011

(65) Prior Publication Data
US 2012/0308170 A1    Dec. 6, 2012

(30) Foreign Application Priority Data
Dec. 2, 2009    (DE) .................. 10 2009 056 527

(51) Int. Cl.
*F16C 43/00*    (2006.01)

(52) U.S. Cl.
USPC .......................................... 384/537; 384/903

(58) Field of Classification Search
USPC .......... 384/537, 538.539, 559, 561, 584, 585, 384/903, 906, 456
See application file for complete search history.

(56) References Cited

U.S. PATENT DOCUMENTS

| | | | |
|---|---|---|---|
| H242 H | * | 4/1987 | Eng ................................ 384/537 |
| 6,666,583 B2 | * | 12/2003 | Nieman et al. ................ 384/537 |
| 8,052,331 B2 | * | 11/2011 | Katougi et al. ............... 384/537 |

FOREIGN PATENT DOCUMENTS

| | | |
|---|---|---|
| DE | 676233 C | 5/1939 |
| DE | 19919201 C1 | 6/2000 |
| DE | 10153432 C1 | 5/2003 |
| EP | 2009302 A2 | 12/2008 |

* cited by examiner

*Primary Examiner* — James Pilkington
(74) *Attorney, Agent, or Firm* — Bryan Peckjian; SKF USA, Inc. Patent Department

(57) ABSTRACT

A bearing assembly comprises at least one bearing that includes at least one outer ring having a recess at at least one circumferential position. A bearing support has at least one receptacle that receives the at least one outer ring. At least one engagement element is disposed on or in the bearing support and engages in the recess in an interference-fit manner to prevent the rotation of the outer ring relative to the bearing support.

5 Claims, 7 Drawing Sheets

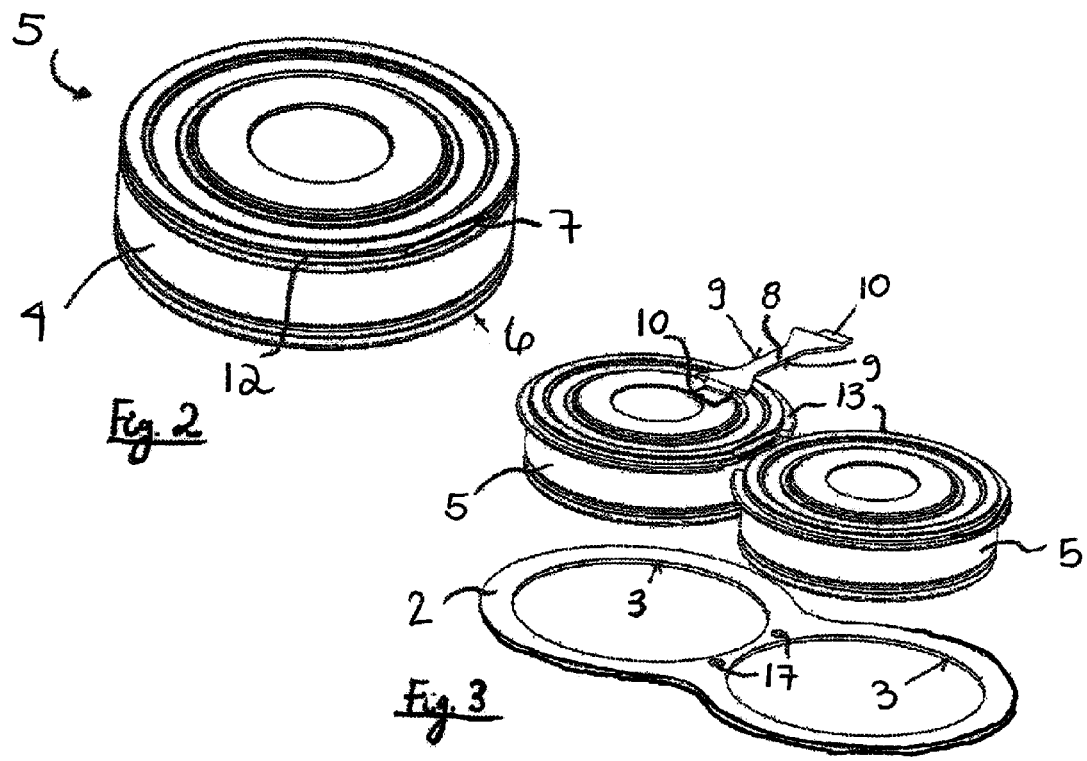
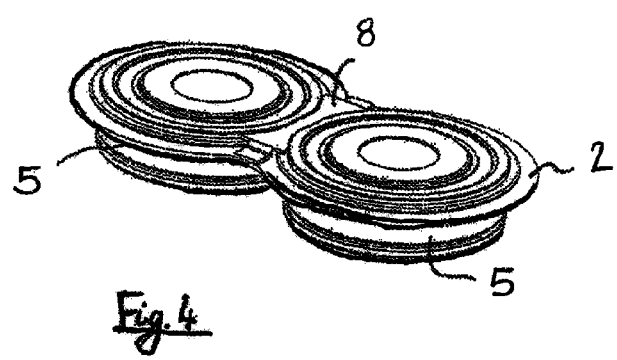

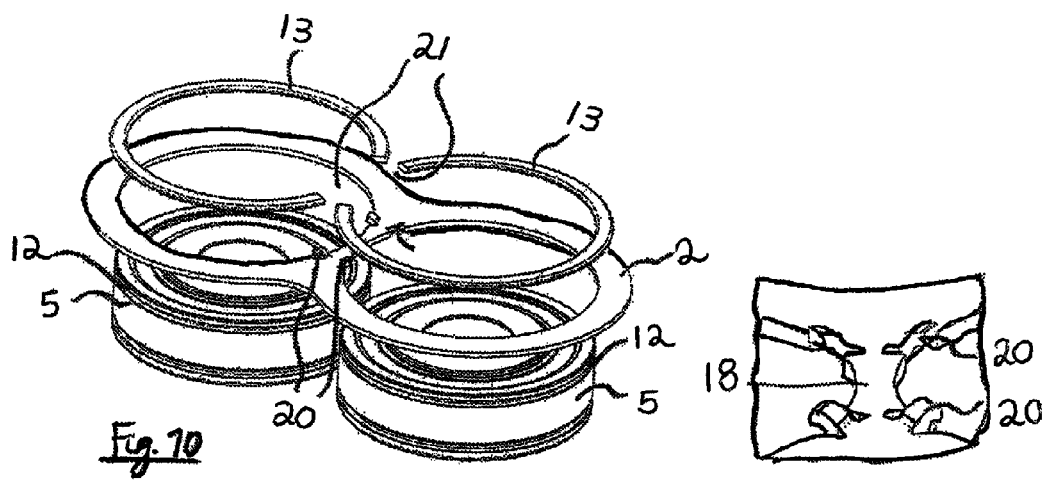
Fig. 10
Fig. 11
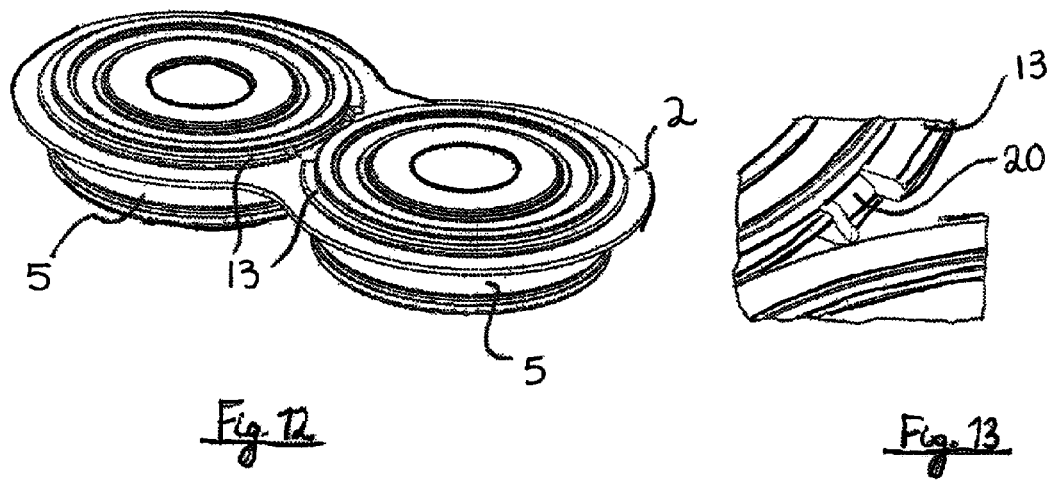
Fig. 12
Fig. 13

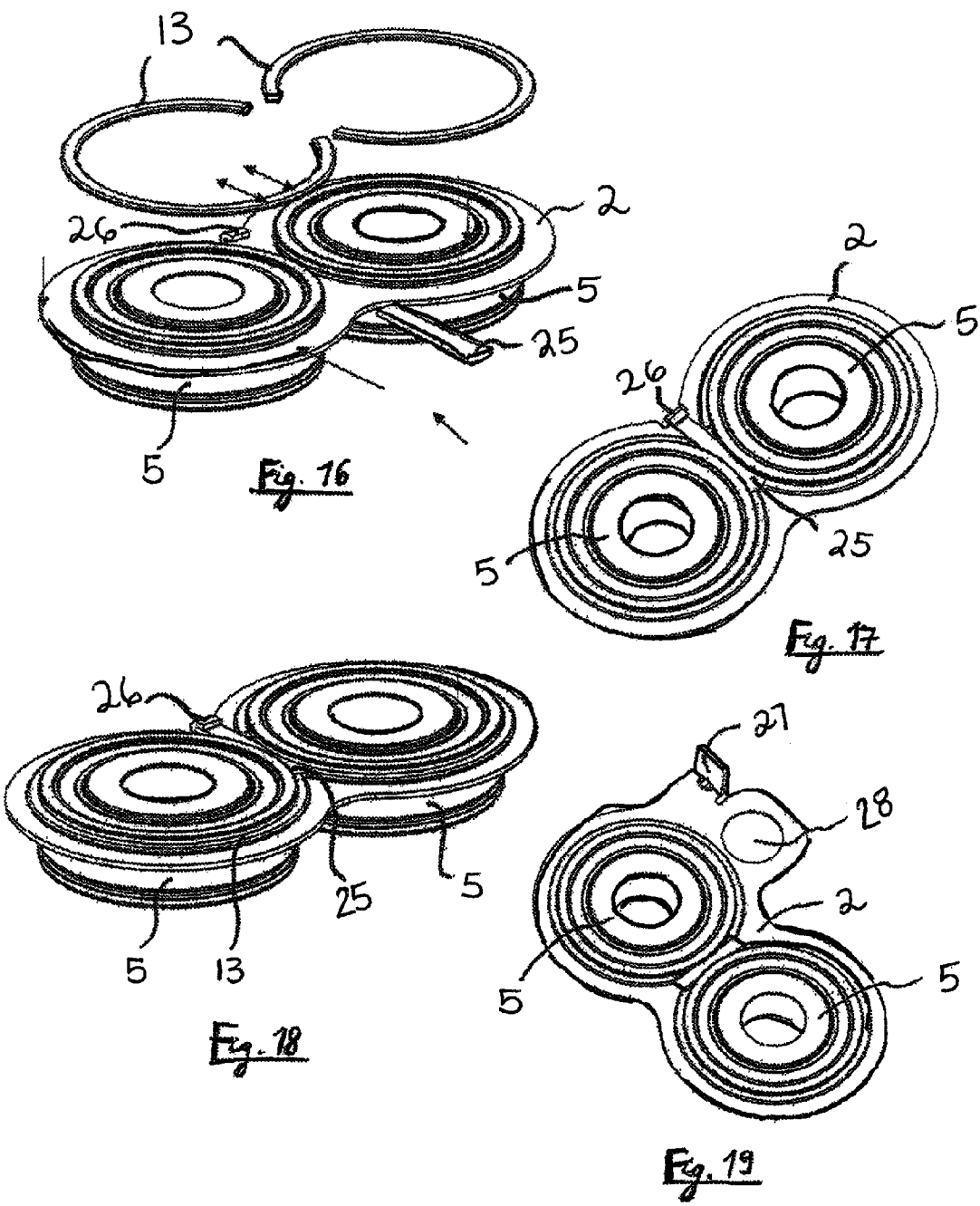

BEARING ARRANGEMENT

CROSS-REFERENCE

This application is the U.S. National Stage of International Application No. PCT/EP2010/068167 filed on Nov. 25, 2010, which claims priority to German patent application no. 10 2009 056 527.2 filed on Dec. 2, 2009.

TECHNICAL FIELD

The invention relates to a bearing assembly comprising a bearing support having at least one receptacle for at least one outer ring of a bearing and at least one bearing.

RELATED ART

Bearing assemblies of this type are well known in the prior art. In particular, they are utilized to implement the bearing for two radially closely spaced transmission shafts that extend in parallel to each other in a transmission housing. For this purpose, a support plate is in most cases provided with two receptacles, e.g., circular cut-outs, for the bearing outer rings; the bearing outer rings and thus the bearings are then fixed relative to the bearing support, for example, by snap rings that extend into circumferential annular grooves in the bearing outer rings. A unit is thus created that can be installed in the transmission housing in a simple way. The bearing support does not necessarily have to transmit bearing loads during the subsequent operation; it can also be utilized as a pure retainer for the bearings until the bearings are set in the housing, namely in corresponding transmission bores. However, it is also possible that the bearing support is designed in a way so that it can support and transmit bearing loads during the operation of the bearings.

When bearings are retained in the bearing support, which, as mentioned, can also function as a retaining element, an undesired co-rotation of the bearing outer rings occurs during the operation depending on a design. For example, a not sufficiently stable bearing seat and various thermal expansion coefficients of the housing- and bearing materials can be the cause of it. This co-rotation of the bearing outer rings can negatively impact the utilization, especially the operating life of the bearing.

SUMMARY

It is therefore an object of the present teachings to disclose a bearing assembly that reliably prevents an undesirable co-rotation of the bearing outer ring(s) in the bearing support during the operation, preferably in a simple and cost-effectively realizable manner.

In one aspect of the present teachings, the outer ring of at least one bearing has a recess in at least one circumferential position and at least one engagement element is disposed on or in the bearing support, wherein when the bearing is installed in the bearing support the engagement element engages in an interference-fit manner in the recess to prevent the rotation of the outer ring relative to the bearing support.

Preferably, the recess is formed as a notch extending in a secant-like manner on the outer circumference of the outer ring. Accordingly, the bearing outer ring is thus, e.g., milled at a circumferential position to create a recess.

Preferably, the outer ring of the bearing is provided with such a recess only at a single circumferential position.

Preferably, the bearing support has two adjacent receptacles for two bearings. In this case, the recesses in the outer rings of the two bearings preferably are disposed adjacent to one another, wherein an engagement element engages in both recesses in an interference-fit manner.

The engagement element can be manufactured as a separate part that is installed on or in the bearing support. In this case, it can be formed as a molded part having an abutment surface formed congruently to the recess. The engagement element can further have an attachment device for fixing on the bearing support. Preferably, the attachment device is formed as at least one bendable tab, more preferably as two bendable tabs, which tab(s) can engage the bearing support from behind.

Alternatively, the engagement element can be also formed as an outward shape from the material of the bearing support. In this case, according to a further development of the invention, it is provided that the engagement element is formed by a material segment of the bearing support, which material segment is curved outwards out of the plane of the bearing support that is embodied in a flat manner. Preferably, the engagement element can be disposed in the connecting area of two adjacent receptacles for the outer ring of a bearing.

According to a further development, the engagement element is comprised of two subcomponents that are formed mirrored with respect to a plane that includes the two axes of the two bearings. These subcomponents can have a free end portion formed in a hook-shaped manner.

Preferably, each outer ring of the bearing has an annular groove, into which a snap ring engages to axially secure the bearing relative to the bearing support.

With the proposed design, it is possible to provide a reliable anti-rotation-function for the bearing outer ring relative to the bearing support, wherein it concerns a rotation about the rotational axis of the bearing.

Exemplary embodiments of the invention are illustrated in the drawings.

BRIEF DESCRIPTION OF THE DRAWINGS

FIG. 2 shows a bearing in a perspective view according to the assembly of FIG. 1, FIG. 3 shows the bearing support in an exploded view together with two bearings according to the assembly of FIG. 1 according to a first embodiment of the invention, FIG. 4 shows the bearing support in a perspective view together with the two bearings in an already assembled state according to the first embodiment of the invention, FIG. 10 shows the bearing support in an exploded view together with two bearings according to the assembly of FIG. 1 according to a fourth embodiment of the invention, FIG. 11 shows an enlarged illustration of a section of the bearing support according to the fourth embodiment of the invention, FIG. 12 shows the bearing support in a perspective view together with the two bearings in an already assembled state according to the fourth embodiment of the invention, FIG. 13 shows an enlarged illustration of a section of the bearing support according to FIG. 12, FIG. 16 shows the bearing support in an exploded view together with two bearings according to the assembly of FIG. 1 according to a sixth embodiment of the invention, FIG. 17 shows the bearing support in a perspective view together with the two bearings in an already assembled according to the sixth embodiment of the invention, FIG. 18 shows the bearing support according to FIG. 17 in a perspective view, as viewed from a somewhat different angle and FIG. 19 shows the bearing support in a perspective view together with the two bearings in an already assembled according to a seventh embodiment of the invention.

DETAILED DESCRIPTION OF THE INVENTION

Figure 1:
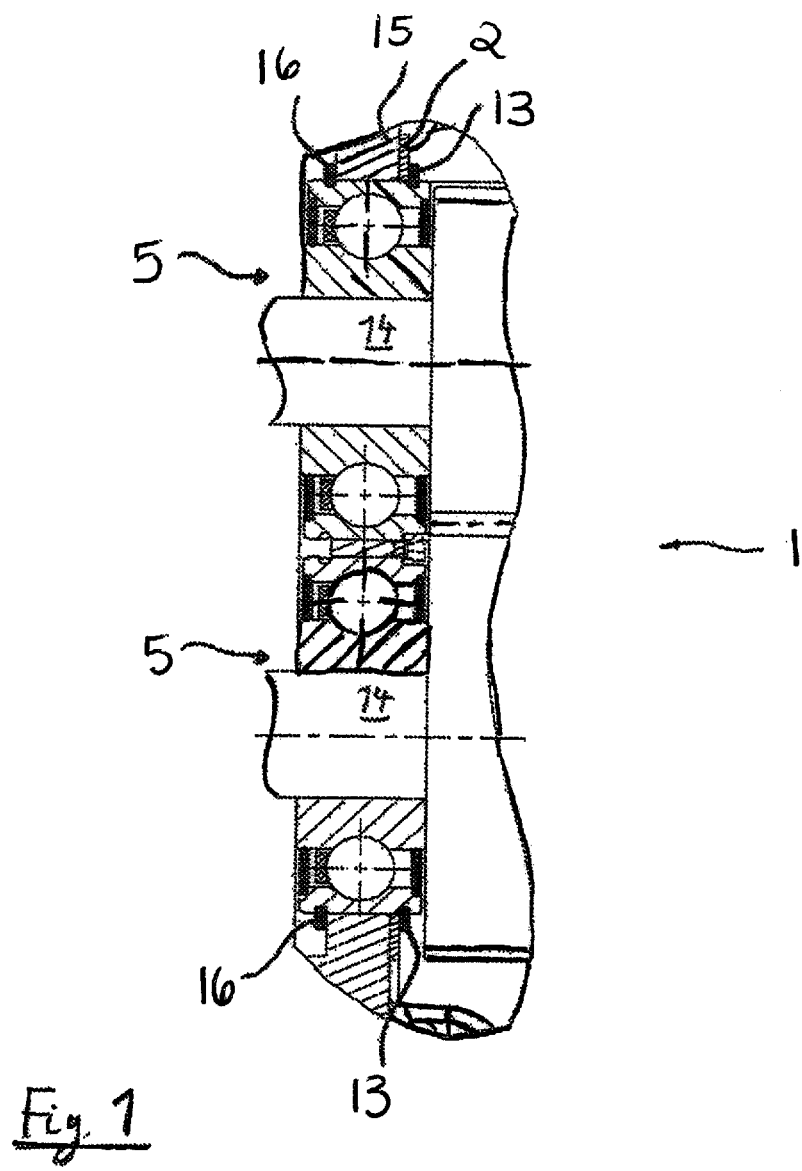
FIG. 1 shows a cut-out from a transmission housing in the radial cross-section, wherein a bearing support is illustrated together with two roller bearings.

In FIG. 1 a bearing assembly 1 can be seen, which comprises two bearings 5, which are utilized, e.g., to support two shafts 14 in a transmission of a motor vehicle. A securing of the bearings 5 in the housing 15 of the transmission is achieved by fixing the bearings 5 with snap rings 13 and 16 on both sides. Due to the small axial distance between the bearings 5, the snap rings 13 and 16 are formed so that they have a wide opening angle, i.e. they are forced open over a relatively large curved section, i.e. the snap rings 13, 16 extend about a circumferential range of significantly less than 360°, e.g., about 330°. Depending on an assembly process, it is required, if necessary, that the bearings 5 are preassembled in an additional component, e.g., made of metal plate, in the form of a bearing support 2 before the installation into the housing 15. Then, during the assembly of the transmission, the bearing support 2 has to be inserted at the appropriate location of the housing 15 along with the bearings 5 retained therein, wherein the bearings 5 are positioned directly in designated bearing bores (retention openings) in the housing 15. This significantly facilitates the actual installation process of the transmission.

A bearing 5 is illustrated in FIG. 2. The bearing outer ring 4 is flattened on one side, i.e., in a circumferential position 6 above an annular grove 12 for the snap ring 13, i.e. a recess 7 is introduced (e.g., milled in) here. As is illustrated in FIG. 3, two bearings 5 can be installed in a bearing support 2 (retainer). For this purpose the bearing support 2 has two receptacles 3 for each respective bearing outer ring 4; the receptacles 3 primarily consist of a circular bore (punching) in the metal sheet of the bearing support 2.

The bearing support 2 has elevations 17 in the form of knobs, which are disposed so that they form an abutment surface for the circumferential end of the snap rings 13 in the circumferential direction and thus prevent a rotation of the snap rings 13.

During the assembly, the bearings 5 are inserted in an oriented manner into the bearing support 2. The snap rings 13 can be already preassembled. To prevent the rotation of the bearings 5, an engagement element 8 (additional element), preferably comprised of a metal sheet or plastic, is positioned in the area of the snap ring openings between the flattened outer rings. The engagement element 8 at least partially conforms to the contours of the outer rings in the area of the recess 7 and is preferably formed straight in the middle portion. The engagement element 8 thus has abutment surfaces 9 that are congruent to the shape of the recesses 7 of the outer rings 4.

The end surface of the engagement element 8 has an attachment device 10 in the form of deformable retaining projections that can be retained in corresponding retaining tabs on the bearing support 2 by bending (which is not depicted). FIG. 4 shows the preassembled bearing assembly ready to be installed into the housing.

Figure 5:
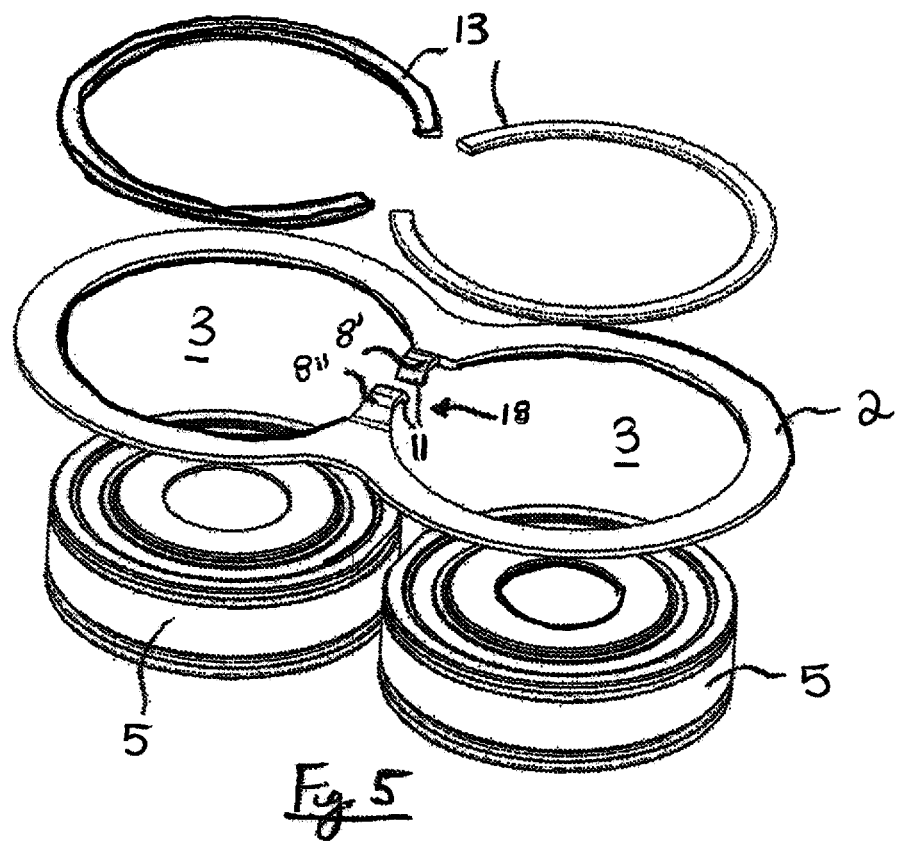
FIG. 5 shows the bearing support in an exploded view together with two bearings according to the assembly of FIG. 1 according to a second embodiment of the invention.
Figure 6:
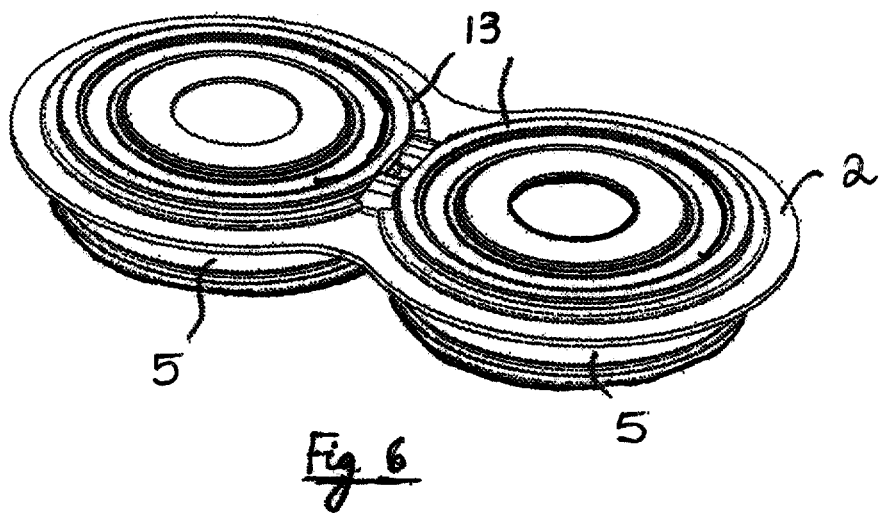
FIG. 6 shows the bearing support in a perspective view together with the two bearings in an already assembled state according to the second embodiment of the invention.

An alternative exemplary embodiment of the invention is shown in the FIGS. 5 and 6. A bridge 18 of the bearing support 2 is implemented here in a snapped-open manner (i.e. separated), which bridge 18 results as a consequence of the receptacles 3, whereby two tab-like subcomponents 8' and 8" are present. The subcomponents 8', 8" are slightly curved outwards out of the plane of the bearing support 2. They each are curved in such a way that a hook-shaped end portion 11 is present. The subcomponents 8', 8" are dimensioned in such a way that they extend into the recesses 7 of the outer rings 4 in assembled bearings 5 and thus prevent a rotation of the outer rings 4 relative to the bearing support 2 about the rotational axis of the bearings 5. Since the subcomponents 8', 8" rise continuously out of the bearing support 2, they also prevent a rotation of the snap rings 13.

A captive retention of the bearings 5 on the bearing support 2 is provided by the snap rings 13. Further embodiments in the further figures are explained for these desirable functionalities, in addition to the anti-rotation function of the outer rings, which embodiments each can be combined with the already described anti-rotational retention of the outer rings.

Figure 7:
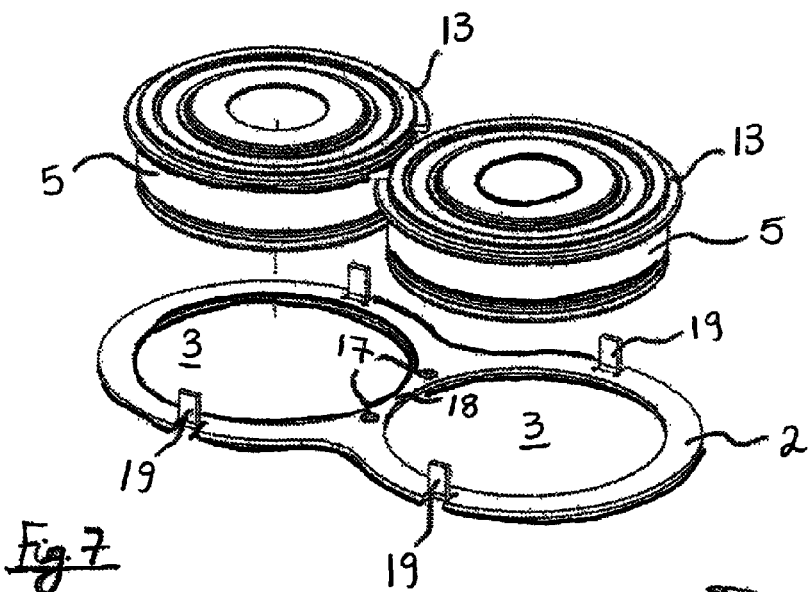
FIG. 7 shows the bearing support in an exploded view together with two bearings according to the assembly of FIG. 1 according to a third embodiment of the invention.
Figure 8:
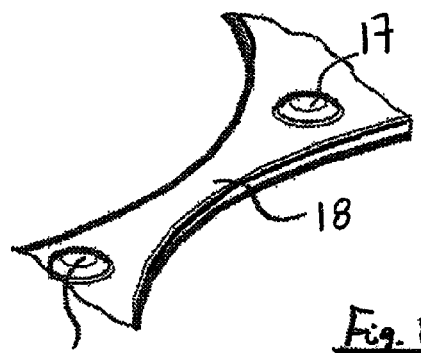
FIG. 8 shows an enlarged illustration of a section of the bearing support according to the third embodiment of the invention.

The bearing assembly, shown in FIG. 7 in a dismantled state, comprises a bearing support 2 (retainer) for the bearings 5, wherein additional components are provided in the form of elevations 17, e.g., made of metal plate or plastic, which elevations 17 are disposed on the bridge 18 between the two receptacles 3. The bridge 18 therefore has elevations (outward shapes) 17 in the form of two knobs. FIG. 8 shows a cut-out enlargement of the bridge 18 and of the knobs 17.

Figure 9:
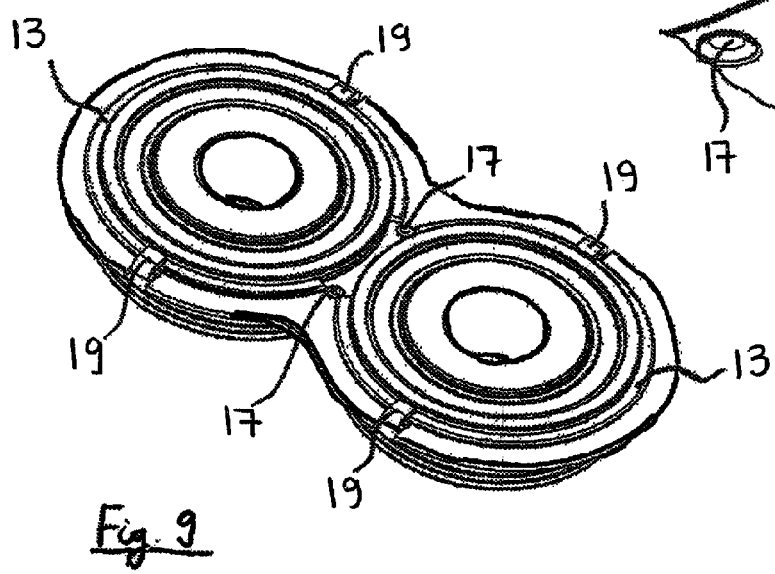
FIG. 9 shows the bearing support in a perspective view together with the two bearings in an assembled state according to the third embodiment of the invention.

The outer rings 4 of the bearings 5 have radially-encircling annular grooves for receiving the snap rings 13. Due to the small spacing of the bearings 5 in the bearing support 2, the snap rings 13 are not formed in a completely radially-encircling manner, as was already mentioned. Before the installation in the bearing support 2, two snap rings 13 are already provided on the bearings 5 in order to fix the bearings 5 in the bearing support 2. For this purpose, the bearing support 2 has tabs 19 attached on the circumference. After the oriented insertion of the bearings 5 with preassembled snap rings 13 into the bearing support 2, the tabs 19 are folded over the snap rings 13 as illustrated in FIG. 9. A captive transport is thereby ensured up to the installation of the bearing assembly into the transmission housing. The knobs 17 in the middle of the bearing support 2, which are located in the area of the snap ring openings, prevent the rotation of the snap rings 13.

An alternative solution is illustrated in the FIGS. 10 to 13. Projections 20 are formed on the bridge 18 of the bearing support 2, which projections 20 form elastic snap elements. A cut-out enlargement is shown in FIG. 11. For the assembly, the bearings 5 are pushed from below into the bearing support 2, wherein the snap rings 13 are not yet mounted. When the bearing support 2 is pushed onto the bearings 5, the projections 20 snap around the bearings 5 into the annular grooves 12 for the snap rings 13. The snap rings 13 are snapped around the bearings 5 in an oriented manner, and in fact such that the projections 20 are located within the snap ring openings 21, whereby the rotation of the snap rings 13 is prevented, analogous to the function of the knobs 17 in FIG. 7. As illustrated in the FIGS. 12 and 13, the bearings 5 are locked in the bearing support 2 in a captive manner.

Since the bearings 5 are secured only by the catch projections 20 (snap elements), a slight tilting of the bearings 5 can occur in this exemplary embodiment. If this should be prevented, a bendable tab can be attached opposite to the bridge 18 or in another portion of the snap rings 13 on the bearing support 2 in a manner analogous to the exemplary embodiment according to the FIGS. 7 to 9, so that the bearings 5 are firmly secured on the bearing support 2.

Figure 14:
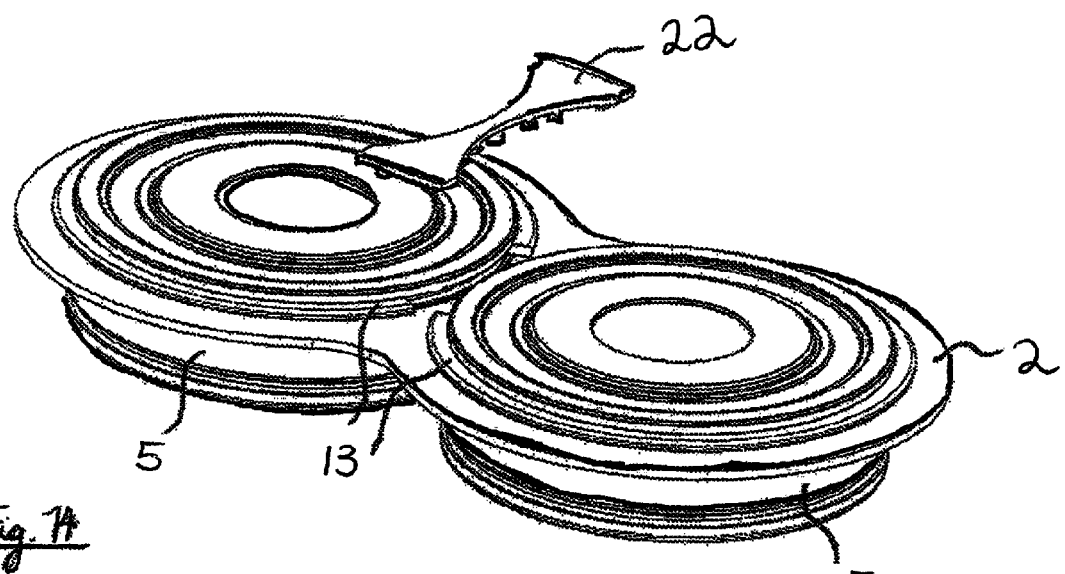
FIG. 14 shows the bearing support in a perspective view together with the two bearings in a nearly assembled state according to a fifth embodiment of the invention, wherein an alignment element is not yet disposed on the bearing support.
Figure 15:
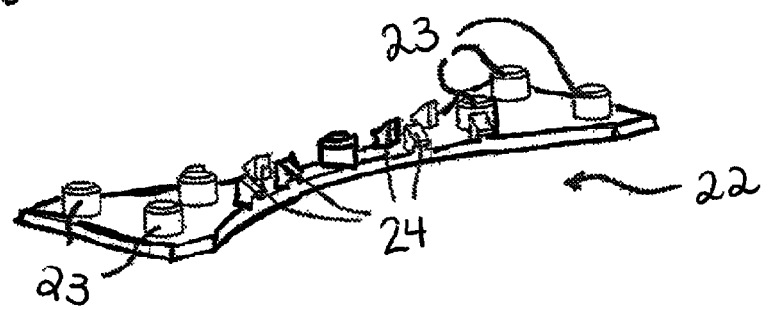
FIG. 15 shows the alignment element in a perspective view according to FIG. 14, with its bottom side rotated upwards.

In FIG. 14, another alternative exemplary embodiment is illustrated, in which a component 22 (retaining element) in the form of a superimposed part is positioned between the bearings 5. The component 22 is illustrated in detail in FIG. 15 (with its bottom side facing upwards). The bearing support 2 for the bearings 5 is a simple metal plate or plastic part with two openings. The component 22 has knobs 23 underneath that provide a defined distance to the upper surface of the bearing support 2. For the retention, the component 22 has hook-shaped projections 24 (snap elements), which snap into the snap ring grooves of the outer rings of the two bearings 5 and thus fix the component 22 on the bearing assembly. A rotation of the snap rings 13 is thus prevented.

In FIGS. 16 to 19 another exemplary embodiment is illustrated. A component 25 in the form of a slide plate is provided between the bearings 5. FIG. 16 shows a partially assembled state with arrows that indicate the assembly process. FIGS. 17 and 18 show different views of the already preassembled bearing assembly.

The component 25 conforms at least partially to the curve of the bearings 5, wherein the minimal spacing of the bearings 5 is considered. It is pushed between the bearings 5 and engages in the snap ring grooves on the outer rings of the bearings 5. Due to the shape of the component 25 (as a flat plate that fans out on its end surface), it is not completely pushable between and beyond the bearings 5. A retainer 26 has a bent tab, into which the component 25 is pushed and retained.

The parts are connected in a captive manner due to subsequent, oriented assembly of the snap rings 13. The snap rings 13 are slightly expanded for the purpose of the assembly and inserted into the snap ring grooves of the outer rings of the bearings 5. The openings of the snap rings 13 lie exactly in the area of the component 25 and are thus retained in an anti-rotational manner.

FIG. 19 shows an enhancement of the exemplary embodiment of the FIGS. 16 to 18. In addition to the retaining function for the bearings 5, the bearing support 2 has another angled tab 27 and an opening 28 that can fulfill functions in the transmission after the assembly, as is the case with well-known bearing supports. Appropriate functional elements can be also provided in the other exemplary embodiments.

The anti-rotation function of the bearings and the captive retention of the snap rings can be combined in an advantageous manner, so that both requirements can be fulfilled at a relatively low production cost. However, it is also possible to provide bearing assemblies that have only one of the two functions, i.e. captive retention function or anti-rotation function of the bearings 5 by appropriately designing bearing supports.

REFERENCE NUMBER LIST 1 bearing assembly
2 bearing support
3 receptacle
4 outer ring
5 bearing
6 circumferential position
7 recess
8 engagement element
8' subcomponent (engagement element)
8" subcomponent (engagement element)
9 abutment surface
10 attachment element
11 hook-shaped end portion
12 annular groove
13 snap ring
14 shaft
15 housing
16 snap ring
17 elevation (knobs)
18 bridge
19 tab
20 projection (catch projection)
21 snap ring opening
22 component (superimposed part)
23 knobs
24 hook-shaped projection (snap element)
25 component (slide plate)
26 retainer
27 tab
28 opening

The invention claimed is:

1. A bearing assembly comprising:
two bearings that each include at least one outer ring having a recess at at least one circumferential position, the recess being located in the middle of both axial ends of the at least one outer ring, the recess is formed as a notch extending along the outer circumference of the outer ring, the at least one outer ring of each of the two bearings has the recess only at a single circumferential position,
a bearing support having two adjacent receptacles for the two bearings, the two adjacent receptacles each being configured to receive the at least one outer ring, an axial length of the bearing support being less than the axial length of the at least one outer ring, and
at least one engagement element disposed on or in the bearing support and engaging in the recess in an interference-fit manner to prevent the rotation of the outer ring relative to the bearing support, the at least one engagement element is manufactured as a separate part that is mounted on or in the bearing support, the engagement element has an attachment device configured to affix the engagement element on the bearing support, the recesses in the outer rings of the two bearings are disposed adjacent to one another, the engagement element engages in both recesses in an interference-fit manner, wherein the attachment device comprises at least one bendable tab configured to engage the bearing support from behind.

2. The bearing assembly according to claim 1, wherein the outer ring of the bearing has an annular groove, into which a snap ring engages to axially secure the bearing relative to the bearing support.

3. A bearing assembly comprising:
two bearings that each include at least one outer ring having a recess at at least one circumferential position, the recess being located in the middle of both axial ends of the at least one outer ring so that both axial ends of the at least one outer ring are recess-free, a bearing support having two adjacent receptacles configured to receive the at least one outer ring, and at least one engagement element disposed on or in the bearing support and engaging in the recess in an interference-fit manner to prevent the rotation of the outer ring relative to the bearing support, the engagement element is formed as an outward projecting shape from the material of the bearing support, the engagement element is formed by a material segment of the bearing support, which material segment is curved outwards out of the plane of the otherwise flat bearing support, the engagement element is disposed in a connecting area of the two adjacent receptacles for the outer rings of the two bearings, the engagement element is comprised of two subcomponents that are formed mirrored relative to a plane that includes both rotational axes of the two bearings, wherein the subcomponents each have a free end portion with a hook formed thereon.

4. A bearing assembly comprising:

a first bearing and a second bearing that both include an outer ring having a recess at one circumferential position, wherein the recess is formed as a notch extending along the outer circumference of the outer ring, a bearing support having two adjacent receptacles configured to receive the outer rings of the first and second bearings, and at least one engagement element manufactured as a separate part that is mounted on or in the bearing support and engages the recess in an interference-fit manner to prevent the rotation of the outer ring relative to the bearing support, the engagement element comprising an attachment device configured to mount the engagement element on the bearing support, wherein the attachment device comprises at least one bendable tab configured to engage the bearing support from behind.

5. A bearing assembly comprising:

two bearings that each include at least one outer ring having a recess at at least one circumferential position, a bearing support having two adjacent receptacles configured to receive the at least one outer ring, and at least one engagement element disposed on or in the bearing support and engaging in the recess in an interference-fit manner to prevent the rotation of the outer ring relative to the bearing support, wherein the engagement element is formed as an outward projecting shape from a material segment of the bearing support, the material segment being curved outwards out of the plane of the otherwise flat bearing support and comprising of two subcomponents that are formed mirrored relative to a plane that includes both rotational axes of the two bearings, the subcomponents each having a free end portion with a hook formed thereon, the engagement element being disposed in a connecting area of the two adjacent receptacles for the outer rings of the two bearings.

* * * * *